United States Patent
Addy et al.

(10) Patent No.: US 9,430,575 B2
(45) Date of Patent: Aug. 30, 2016

(54) SYSTEM AND METHOD OF ENHANCING CONSUMER ABILITY TO OBTAIN INFORMATION VIA BAR CODES

(75) Inventors: Kenneth L. Addy, Massapequa, NY (US); Jaime E. Barahona, Hempstead, NY (US); Albert Lee, Brooklyn, NY (US); Howard Yuk, East Meadow, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 118 days.

(21) Appl. No.: 13/270,264

(22) Filed: Oct. 11, 2011

(65) Prior Publication Data
US 2013/0087608 A1 Apr. 11, 2013

(51) Int. Cl.
G06F 17/30 (2006.01)

(52) U.S. Cl.
CPC ............... *G06F 17/30879* (2013.01)

(58) Field of Classification Search
CPC ................................. G06F 17/30879
USPC ............................ 235/375; 705/14.4, 14.73
See application file for complete search history.

(56) References Cited

U.S. PATENT DOCUMENTS

| | | | |
|---|---|---|---|
| 7,337,968 B2* | 3/2008 | Wilz et al. | 235/462.01 |
| 2004/0122771 A1* | 6/2004 | Celi et al. | 705/43 |
| 2008/0203167 A1* | 8/2008 | Soule et al. | 235/462.01 |
| 2010/0225653 A1* | 9/2010 | Sao et al. | 345/520 |
| 2012/0026530 A1* | 2/2012 | Tsongas et al. | 358/1.14 |
| 2012/0128267 A1* | 5/2012 | Dugan et al. | 382/321 |
| 2012/0187187 A1* | 7/2012 | Duff et al. | 235/382 |
| 2012/0222081 A1* | 8/2012 | Schaefer | H04N 17/04 725/132 |
| 2012/0295591 A1* | 11/2012 | Boudville | 455/414.1 |
| 2013/0026217 A1* | 1/2013 | Boudville | 235/375 |
| 2013/0069794 A1* | 3/2013 | Terwilliger et al. | 340/815.45 |

* cited by examiner

*Primary Examiner* — Toan Ly
(74) *Attorney, Agent, or Firm* — Husch Blackwell LLP

(57) ABSTRACT

A system and method to use bar codes to facilitate obtaining information as to a product or service are provided. A smart phone, with a downloaded scanning application, can scan a bar code associated with a product or service. Information can be extracted from the code by the phone and the scanning application and forwarded automatically to a web server, via one or more computer networks. The server can analyze the information and extract other, responsive data from its data base. The responsive data can be downloaded to the scanning device for use with the product or service.

16 Claims, 1 Drawing Sheet

Printed, or, dynamic QR 2D Barcode with information of the product status. (e.g. error code, config status etc.)

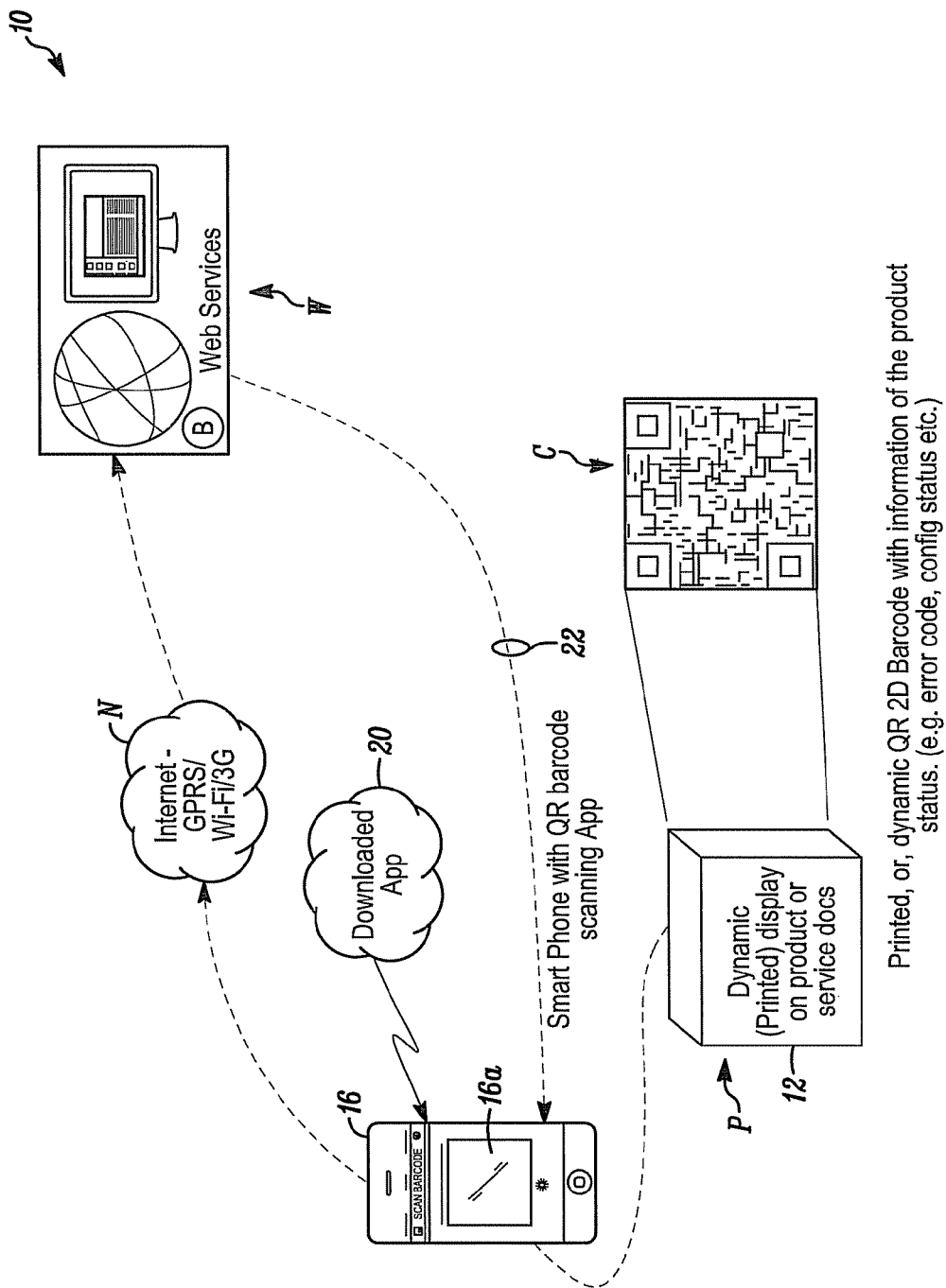

SYSTEM AND METHOD OF ENHANCING CONSUMER ABILITY TO OBTAIN INFORMATION VIA BAR CODES

FIELD

The application pertains to systems and methods of providing information to customers or users in connection with products or services via bar codes. More particularly, the application pertains to such systems and methods where bar codes can function as information retrieval facilitators, when scanned, to provide selected information to customers or users for troubleshooting, installation, or other purposes.

BACKGROUND

Appliances, or other types of equipment found in homes, or residences, are increasingly complex to install and to maintain. Installation manuals and fault finding manuals for modern electronics systems are complicated and verbose. Large displays are, at times needed to show detailed error messages, and these are expensive and add complexity to equipment. Many types of equipment found in homes or residences have relatively small displays.

Examples of such electronics equipment include HVAC systems, home entertainment, white goods, life safety devices or residential or commercial security systems. In all cases, this kind of equipment is increasingly complex to install, maintain and repair.

For example, home automation systems, at times, lack adequate customer service capabilities when there is a problem with the system or the customer needs to be in contact with a representative. Because of resource constraints, such as system cost, memory, and processing power, a typical home automation system may only annunciate basic codes or texts to indicate any trouble conditions.

The customer would then have to search through the system manual or call customer support to get more information and instructions to rectify the problem. Depending on business cost constraints, the central station may take a while to respond to the customer's call or to dispatch a service technician.

In general, residential electronics systems, at times, lack a convenient method for the customer and the technical assistance team to be in contact for support. For example, there is not a quicker way for the customer to reach a representative other than to call using a phone or to turn on the customer's computer and use a web site.

BRIEF DESCRIPTION OF THE DRAWING

FIG. 1 is a diagram illustrating aspects of a system and method in accordance herewith.

DETAILED DESCRIPTION

While disclosed embodiments can take many different forms, specific embodiments hereof are shown in the drawings and will be described herein in detail with the understanding that the present disclosure is to be considered as an exemplification of the principles hereof, as well as the best mode of practicing the same, and is not intended to limit the claims hereof to the specific embodiment illustrated.

Embodiments hereof can take advantage of the fact that most electronics devices used in a home, or residence, have a display of some kind, e.g. a security system has a display for the home owner to control the security system. A refrigerator might have a two digit LED display to show an error code, which subsequently has to be researched on-line or in a verbose and often confusing paper manual. Alternately, these existing displays can be used to display barcodes, e.g. QR codes, which are relatively simple to display on a small low cost display. It is also possible to print QR codes as stickers, which can be attached to various types of equipment.

In one aspect, barcodes can be used to facilitate the delivery of various types of product or service related information to customers or users. Barcodes, such as the QR-code and data matrix, can store substantial amounts of information in a small footprint. Information such as a URL, text, phone numbers, and SMS, can be embedded onto a barcode. It will be understood that the details of any specific bar code are not limitations hereof.

To scan the barcode, a customer can execute an application on a portable communications device, such as a smart phone. The user or customer points the camera at the barcode (irrespective of being presented on a display or as a printed element). Depending on how the barcode has been formatted, the application can display the embedded text information or automatically connect to a web site.

Alternately, the codes can be used to display/down-load web pages to a tablet computer, smart phone, or equivalent portable communications device to lead a home owner or technician through an installation process, configuration and subsequently, when a product is in service, to review error messages and fault finding information.

In another aspect, the barcodes can include contact information for the system, such as account number, IP MACID, WiFi MACID, GSM MACID, model, version, etc. In one embodiment, when a product or system is exhibiting a trouble condition, a barcode can be displayed on the console's screen. The customer can scan the barcode via a smart phone, or equivalent device, and be directed to a server that can present a video with information on how to fix the problem. This will save the customers' time in not needing to call technical support.

Alternately, the customer can also scan a barcode sticker and be connected to a web site to pay bills or request service. Where the product/service relates to a security monitoring system, where a representative needs to contact the customer, a central station can generate a barcode and transmit it to the local system's keypad screen. The customer will then scan it and the smart phone's application will either translate it to a readable format or load a web site with more information.

Hence, the displayed bar or QR code can be linked via a smart phone with a camera, or an equivalent device, to a web-site with comprehensive fault-finding and error checking information. Advantageously, in the case of a security system, there is always a small display which could display a bar or QR code.

In summary, in one embodiment, an end user can use a smart phone, or equivalent device, which includes a downloaded application to issue a connect request to a web service by scanning a barcode defined for the relevant product/service being used, installed, or repaired. The bar code is presented on a small display device on the product, or is displayed as a pre-printed tag attached to the product or to physical material associated with a particular service.

Based on the bar coded input, a web service parses the input information and returns other information to the phone user, which can then facilitate taking additional, appropriate steps relative to the product/service.

Multiple bar codes can be sequentially displayed, or presented, as a pre-printed sequence to the user. The web service can send detailed step-by-step instructions as the end-user scans each code that is displayed.

FIG. 1 illustrates a system 10 for providing bar code facilitated information to a user or customer of/for a product P, or a service of interest. In one embodiment, product P can carry an electronic display 12, perhaps driven by a local computer. A bar code, for example, bar code C can be presented on the display. Alternately, an appropriate bar code can be preprinted on a label, or substrate, and attached to the product P, or materials associated with a service of interest.

Irrespective of form, a communications product, such as a smart phone, or an equivalent-type product, or a pad computer, indicated at 16, with a camera and scanning software (which could be downloaded wirelessly as an executable application, indicated at 20), can be used to scan the barcode C. The scanned image can be presented on a display of the device 16, as at 16a.

Some or all of the information on the bar code C can be extracted, via the downloaded application, and forwarded, via one or more computer networks N, to a web server W, a source of services and information as to the product P or the services of interest. In response to the information provided by the device 16 and code C, the server W can extract, parse, and return relevant information to the device 16, as at 22.

The user can view the information presented on a display on the device 16, as at 16a, and take appropriate action. It will be understood that a sequence of bar codes, such as code C, can be presented by the user via the display 12, or in pre-printed form, to the server W, which, in turn, can provide a sequence of appropriate, responsive information.

In summary, the present system and method provides an electronics system that can be installed, configured, and maintained by end users in easy steps to address the issues with increasingly complex equipment found in homes and offices.

In the system, step by step instructions can easily be fed to a smart phone, or equivalent device, using dynamic QR codes presented on a small low cost equipment display, or pre-printed on a substrate. The cost of repair and installation can, as a result, be reduced since a professional installer is not always required to install and maintain the system.

Operationally, the user scans the bar code using a smart phone that automatically connects to a web service and guides the repair, configuration, etc. process. In the process, in one embodiment, the user can capture the QR code using a smart phone's camera.

In yet other embodiments, the product P can present barcode links for training or troubleshooting videos. A remote site can push barcode links to coupon offers. Alternately, a remote site can push barcode links for reminders or messages.

The bar code can contain a link to the product P for configuration purposes. Further, the user interface can be decoupled. The product may contain a web server to drive the content of the display 12 for the scanning device 16. Then, the scanning device 16 can access, modify, and push the configuration data back onto the product P. If the product P does not have a web server, the user interface may also be presented by the remote server W for the scanning device 16. The configuration data can then be pushed to the server W, which will eventually be relayed into the product P.

In yet another embodiment, the product P can contain a camera and barcode processing software to further decouple the user interface. If the scanning device 16 has the ability to generate barcodes, the product P can then take commands directly from the scanning device 16. Effectively, the product P and the scanning device 16 will be exchanging direct commands and requests through barcodes. The bar code links can also be used in a guard tour mode where a guard can obtain information or a procedure on what to do if something out of the ordinary has occurred.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be added to, or removed from the described embodiments.

The invention claimed is:

1. A method comprising:
   identifying at least a trouble condition of a problem with a product or a service;
   responsive to the identifying, providing a bar code associated with the trouble condition of the problem with the product or the service on a display device on the product, on a printed tag attached to the product, or on physical material associated with the service;
   providing a portable communications device;
   scanning the bar code with the portable communications device;
   extracting at least some information embedded in the scanned bar code;
   transmitting, via a computer network, the extracted at least some information, to a remote source of information pertaining to the product or the service;
   downloading, from the remote source of information, via the computer network, responsive information identified, at least in part, by the transmitted at least some information; and
   the portable communications device and the product exchanging direct commands and requests via a plurality of bar codes, including the bar code, to fix the problem.

2. A method as in claim 1 wherein downloading comprises downloading the responsive information to the portable communications device and displaying the responsive information at least in part, on the portable communications device.

3. A method as in claim 1 which includes downloading a bar code scanning application program to the portable communications device and executing the bar code scanning application program at the portable communications device.

4. A method as in claim 1 wherein providing the bar code includes providing the bar code by one of displaying the bar code as a temporal, electronically generated image or displaying the bar code as a fixedly printed image.

5. A method as in claim 4 which includes displaying a sequence of bar codes, including the bar code.

6. A method as in claim 5 wherein downloading comprises downloading the responsive information to the portable communications device and displaying the responsive information, at least in part, on the portable communications device.

7. A method as in claim 6 which includes downloading a bar code scanning application program to the portable communications device and executing the bar code scanning application program at the portable communications device.

8. A method as in claim 1 wherein the remote source of information forwards the responsive information to at least one of third party users or product or service providers.

9. A method as in claim 1 wherein the at least some information embedded in the scanned bar code includes an executable link, and wherein the method further comprises adjusting the product or the service as a result of executing the executable link.

10. A method as in claim 1 which includes generating a representation of a different bar code at the portable communications device.

11. A method as in claim 10 which includes using the product, scanning the different bar code, and adjusting the product in accordance therewith.

12. An apparatus comprising:
a computer based source of information; and
a portable communications device that scans selected types of codes presented transiently on a display device on a product, printed on a tag attached to the product, or printed on physical material associated with a service, the selected types of code are, in part, responsive to an identifier condition of the product, including at least a trouble condition indicating a problem with the product, that extracts at least some information embedded in the scanned selected types of codes, that transmits, to the source of information, via a communications network coupled to the source of information and the portable communications device, the extracted at least some information, that downloads, from the source of information, via the communications network, responsive information identified, at least in part, by the transmitted at least some information, and that exchanges direct commands and requests with the product via bar codes to fix the problem.

13. An apparatus as in claim 12 wherein the portable communications device includes a display unit for graphically and visually presenting, at least in part, the responsive information from the source of information.

14. An apparatus as in claim 13 wherein the portable communications device includes a wireless port and downloads a bar code scanning application.

15. An apparatus as in claim 14 wherein the source of information comprises a web server coupled to the communications network.

16. An apparatus as in claim 15 wherein the responsive information corresponds to the product or the service associated with the scanned selected types of codes.

* * * * *